(12) United States Patent
Koch et al.

(10) Patent No.: US 8,906,331 B2
(45) Date of Patent: *Dec. 9, 2014

(54) NITRIC OXIDE OXIDATION OVER SILVER-BASED CATALYSTS

(71) Applicant: GM Global Technology Operations LLC, Detroit, MI (US)

(72) Inventors: Calvin K. Koch, Bloomfield Hills, MI (US); Gongshin Qi, Troy, MI (US); Steven J. Schmieg, Troy, MI (US); Wei Li, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 16 days.

This patent is subject to a terminal disclaimer.

(21) Appl. No.: 13/664,486

(22) Filed: Oct. 31, 2012

(65) Prior Publication Data

US 2013/0294989 A1 Nov. 7, 2013

Related U.S. Application Data

(60) Provisional application No. 61/643,472, filed on May 7, 2012, provisional application No. 61/644,510, filed on May 9, 2012.

(51) Int. Cl.
*B01D 53/94* (2006.01)
*F01N 3/20* (2006.01)

(52) U.S. Cl.
USPC .................................................... 423/213.5

(58) Field of Classification Search
USPC .................................................... 423/213.5
See application file for complete search history.

(56) References Cited

U.S. PATENT DOCUMENTS

| 5,559,072 A * | 9/1996 | Itoh et al. ........................ 502/347 |
| 2008/0066456 A1 | 3/2008 | Schmieg et al. |
| 2009/0269263 A1 * | 10/2009 | Rohart et al. ............... 423/213.2 |
| 2011/0011068 A1 * | 1/2011 | Ren et al. ........................ 60/297 |
| 2012/0079813 A1 | 4/2012 | Sloan et al. |

FOREIGN PATENT DOCUMENTS

EP 1541219 A1 * 6/2005

OTHER PUBLICATIONS

Julian Edgar, "Common Rail Diesel Engine Management, Part 1", Autospeed, Issue 414, Jan. 20, 2007.*

* cited by examiner

*Primary Examiner* — Ngoc-Yen Nguyen
*Assistant Examiner* — Anita Nassiri Motlagh
(74) *Attorney, Agent, or Firm* — Reising Ethington P.C.

(57) ABSTRACT

$Ag/Al_2O_3$ materials may be packaged in a suitable flow-through reactor, close coupled to the exhaust manifold of a diesel engine, and upstream of other exhaust gas treatment devices, such as a diesel oxidation catalyst and a selective reduction catalyst for NOx. The silver/alumina catalyst material uses hydrogen in a cold-start engine exhaust and serves to oxidize NO to $NO_2$ in the relatively low temperature, hydrocarbon-containing, exhaust during a short period following the engine cold start, and to temporarily store NOx during the start-up period. After the exhaust has heated downstream catalytic devices, the silver yields its nitrogen oxides for conversion to nitrogen by the then-operating devices before NOx is discharged to the atmosphere.

18 Claims, 2 Drawing Sheets

NITRIC OXIDE OXIDATION OVER SILVER-BASED CATALYSTS

This application claims priority based on provisional application 61/643,472, titled "Nitric Oxide Oxidation over Silver Based Catalysts," filed May 7, 2012 and which is incorporated herein by reference. This application also claims priority based on provisional application 61/644,510, titled Silver Promoted Close-Coupled NOx Absorber, filed May 9, 2012 and which is incorporated herein by reference.

TECHNICAL FIELD

This disclosure pertains to the oxidation of nitric oxide (NO) to nitrogen dioxide ($NO_2$) in the relatively low-temperature exhaust (e.g., from about 75° C. up to about 250° C.) from a diesel engine following a cold start. A silver-based catalyst (Ag or silver oxide nanoparticles supported on $Al_2O_3$ particles), close-coupled to the exhaust manifold is effective in oxidizing a significant portion of the NO to $NO_2$ in a hydrogen-containing exhaust. The silver catalyst material also serves to temporarily store the NOx during warm-up of downstream catalytic reactors that are located for conversion of exhaust constituents for discharge into the atmosphere.

BACKGROUND OF THE INVENTION

Over the past several decades automotive vehicle manufacturers have satisfied continually-decreasing limits on the amounts of carbon monoxide, unburned hydrocarbons, and nitrogen oxides (collectively, NOx) that are discharged to the atmosphere in the exhaust from vehicle engines. These requirements of reduced exhaust emissions are combined with requirements for increased fuel economy. These combined requirements have required ever more sophisticated engines, computer control of engines, and exhaust gas treatment systems, including catalytic reactors, in the exhaust stream.

Present exhaust treatment systems are quite effective in treating the exhaust from a warmed-up engine because the catalyst materials have been heated to temperatures (e.g., 250° C. and above) at which they serve to effectively oxidize carbon monoxide and incompletely burned fuel constituents to carbon dioxide and water, and to reduce nitrogen oxides to nitrogen. These treatment systems have been quite effective for both gasoline-fueled engines operating at a stoichiometric air-to-fuel ratio and diesel engines (and other lean-burn engines) which operate with considerable excess air (sometimes called "lean burn"). It has been difficult to treat exhaust emissions immediately following a cold engine start, before the exhaust has heated the catalytic reactor or reactors to the effective temperatures of the catalyst materials. It is realized that such untreated emissions will make-up a significant portion of the total emissions in the mandated testing of engine exhaust systems. The problem is particularly difficult with the treatment of mixed nitrogen oxides in the exhaust of diesel engines. These nitrogen oxides comprise nitric oxide (NO) and nitrogen dioxide ($NO_2$), the mixture typically referred to as NOx. There is, therefore a need for better systems for treating the exhaust gas from an engine following a cold start. The need is particularly acute in lean-burn engines, such as diesel engines, which tend to produce cooler exhaust streams because of the excess air used in the combustion mixtures charged to their cylinders.

SUMMARY OF THE INVENTION

Illustrative practices of this invention will be described in terms of the specific embodiment of a diesel engine in an automotive vehicle. But practices of the invention are also applicable in the cold starting period of lean-burn gasoline engines and other hydrocarbon fuel burning, internal combustion engines (whether compression ignited or spark ignited) which are operated such that they produce a combination of nitric oxide and hydrogen in their exhaust gas stream, particularly following a start-up of the engine when it is at an ambient temperature or at a temperature below its warmed up operating temperature and its exhaust gas has not heated the exhaust treatment systems of the vehicle to their operating temperatures.

The composition of the exhaust gas pumped by piston action from the exhaust manifold of a diesel engine is a function of the composition of the compression-ignitable diesel fuel, the high air-to-fuel mass ratio (typically about 17:1), and the efficiency of the combustion of the air/fuel mixture in the cylinders of the engine. The exhaust gas stream pumped from the exhaust manifold of a warmed up diesel engine comprises a mixture of nitrogen oxides, carbon monoxide, carbon dioxide, incompletely burned hydrocarbons, oxygen, water, and nitrogen. It is necessary to minimize the discharge of each constituent other than nitrogen, oxygen, carbon dioxide, and water. Of course, increased efficiency in fuel usage and combustion in the engine tends to decrease the discharge of carbon dioxide and other exhaust constituents.

One practice for the treatment of diesel exhaust has subjected the gas to a sequence of processing steps. The exhaust gas leaving the exhaust manifold of the engine is conducted through sections of suitable high temperature-resistant and oxidation-resistant metal tubing passing under the body of the vehicle and between two or more containers of catalyst material or filter material before the gas is released from the last tubing section to the atmosphere For example, the hot exhaust is first passed over a diesel oxidation catalyst (DOC, composed typically of a mixture of very small particles of platinum group metals deposited on high surface area particles of alumina) for oxidation of unburned hydrocarbons, carbon monoxide, and of nitric oxide to nitrogen dioxide. Downstream of the DOC, a suitable quantity of a selected reductant material such as ammonia (from urea) is injected into the exhaust stream and the exhaust, now containing the added reductant, is passed over a further catalyst selected for the chemical reduction of $NO_2$ (and NO) to nitrogen. This second induced reaction is often called Selective Catalytic Reduction (SCR) because the chosen catalyst depends on the reductant material added to the exhaust stream. A diesel particulate filter (DPF) body is typically also placed in the exhaust stream.

Present reduction catalysts for the use of ammonia as the reducing substance include suitable iron-substituted zeolites and copper-substituted zeolites. This reduction system works best when an appreciable portion of the NO leaving the exhaust manifold, typically about 50%, has been oxidized to $NO_2$. This practice is effective when the exhaust stream has heated the DOC and SCR to suitable operating temperatures. But diesel exhaust exiting the exhaust manifold, immediately following a cold start, hasn't had time to heat the DOC and SCR, and untreated exhaust constituents enter the atmosphere. Further, the cold start exhaust typically also contains hydrogen.

This invention provides a catalyst material consisting of very small (nanometer size) particles of silver (or a silver oxide) deposited on and supported by larger particles of high surface area alumina ($Ag/Al_2O_3$). This particulate material typically contains about one-half to about ten percent by weight of silver. It is found that this silver-based catalyst (in the presence of a small amount of hydrogen) is very effective in the oxidation of nitric oxide (NO) to nitrogen dioxide ($NO_2$) and the temporary storage of mixed nitrogen oxides (NOx) in exhaust gas streams at temperatures of about 75° C. to 250° C. (preferably, about 100° C. to about 190° C.). As will be described in more detail in this specification, a flow-through reactor with channel wall surfaces carrying suitable wash coat layers of this supported silver material, close coupled to the exhaust manifold of a diesel engine, may be used to reduce tailpipe emission of NOx for periods immediately following an engine cold start.

During the period following starting of a diesel engine (or other lean burn engine) the exhaust gas typically contains hydrogen in amounts of about 100 ppm to about 1000 ppm or more, in addition to NOx, carbon monoxide, hydrocarbons, carbon dioxide, oxygen, water, and nitrogen. In accordance with practices of this invention, a silver-based catalyst is placed upstream of the PGM-containing DOC. The $Ag/Al_2O_3$ material is effective for oxidation of a significant portion of the NO to $NO_2$ in preparation for the downstream SCR reactor. The silver catalyst not only effectively promotes the oxidation of NO in the presence of hydrogen in the relatively cool exhaust, it also acts as a temporary storage mass for the resulting mixture of $NO_2$ and residual NO during periods of relatively low exhaust gas temperatures, e.g., below about 250° C. The function of our silver reactor, close-coupled to the diesel exhaust manifold and upstream in exhaust flow to the PGM DOC, is temporary. Close-coupled catalysts are typically mounted from about five centimeters to about fifty centimeters downstream from the exhaust manifold or from a turbocharger placed near the exhaust manifold to re-circulate a portion of the exhaust. The silver reactor serves as an oxidation catalyst and storage material only until it is heated above about 250° C. Thereafter, the hydrogen content of the exhaust is also often inherently reduced and the operating temperatures of the downstream flow-through DOC and SCR catalyst bodies permit commencement of their intended functions. Then the hot exhaust gas simply flows through the silver-based material and on to the downstream reaction bodies. However, later, when the vehicle engine experiences another cold start, the silver reactor is in-place to serve its NO oxidation and temporary NOx storage functions.

In one embodiment of the invention the silver/alumina catalyst and temporary NOx storage material is deposited as a wash coat on the walls of an extruded cordierite monolith body having many parallel flow-through channels extending from an inlet face to an outlet face. The monolithic body is typically round or elliptical in cross-section and has, for example, 400 channels per square inch of inlet face surface area, each with a square or hexagonal opening. The monolithic body may be contained in a suitable high temperature and oxidation resistant container (e.g., a stainless steel body), with an exhaust gas flow inlet and downstream outlet, and positioned close-coupled to the exhaust manifold of the engine. Thus, the flow of the exhaust gas is divided into the channels of the cordierite body and is brought into intimate contact with the silver catalyst particles deposited on each channel passage wall. The total amount of such silver-containing catalyst is determined for providing for the oxidation of NO and the temporary storage of NOx based on the exhaust flow and warm-up time for the piston stroke displacement of the diesel engine from which the exhaust flows. A representative space velocity for the flow through wash-coated channels of the monolith may be about 50,000 $h^{-1}$. In other embodiments of the invention the silver/alumina material may be supported on a metallic substrate or on a different wall-flow substrate.

Other objects and advantages of the invention will be apparent from the description of specific examples which follows in this specification.

DESCRIPTION OF PREFERRED EMBODIMENTS

Figure 1:
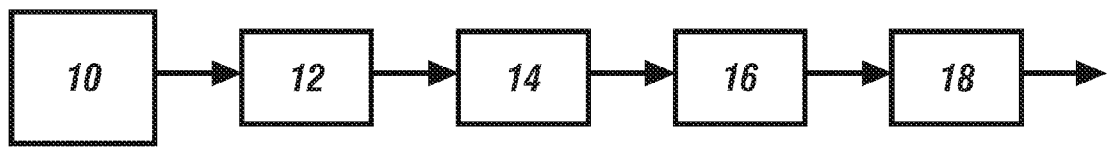
FIG. 1 is a schematic diagram illustrating the flow of a NO-containing and hydrogen-containing diesel exhaust stream (process flow box 10) leaving an exhaust manifold and flowing sequentially through a silver-alumina ($Ag/Al_2O_3$) catalyst bed (box 12), a diesel oxidation catalyst bed (DOC, box 14), a selective catalytic reduction bed, (SCR, box 16) and a diesel particulate filter (DPF, box 18).

Exhaust emissions from a vehicle engine operated on a dynamometer are often evaluated by operating the engine in accordance with a specified testing procedure in which the engine may be subjected to a cold-start and thereafter accelerated and decelerated as prescribed. One such procedure is the U.S. Federal Test Procedure 75 Cycle. When a representative light-duty diesel engine is operated in accordance with the FTP 75 Cycle it is found that more than 50% of the tailpipe emissions of NOx are emitted during the first two test cycles following a cold start. It is an object of this invention to provide a method and silver based catalyst system for use in reducing NOx tailpipe emissions during such engine operating periods.

During warmed-up operation such diesel engines typically produce a hot gaseous exhaust with relatively high contents of oxygen, water, and nitrogen oxides ($NO_x$). In the case of diesel engines, the temperature of the exhaust gas is typically in the range of 50-150 degrees Celsius from a cold engine and 200-400 degrees Celsius from a warmed-up engine (depending, for example, on engine load), and has a representative composition, by volume, of about 10% oxygen, 6% carbon dioxide, 5% water, 0.1% carbon monoxide, 180 ppm hydrocarbons, 235 ppm $NO_x$ (mostly NO) and the balance substantially nitrogen. The exhaust gas often contains some very small carbon-rich particles. And to the extent that the hydrocarbon fuel contains sulfur, the exhaust from the combustion source may also contain sulfur dioxide. It is desired to treat such exhaust gas compositions to minimize the discharge of any substance to the atmosphere other than nitrogen, carbon dioxide, and water. A representative value of the flow rate of such a vehicular exhaust stream, with respect to the effective volume of exhaust treatment devices, is, for example, 50,000 $h^{-1}$.

The $NO_x$ gases, typically comprising varying mixtures of nitrogen oxide (NO) and nitrogen dioxide ($NO_2$), are difficult to reduce to nitrogen ($N_2$) because of the high oxygen ($O_2$) content in the hot exhaust stream. It is found that when a portion of the NO is oxidized to $NO_2$, there are selective catalytic reduction compositions and flow-through catalytic reactor designs for reducing much of the NO and $NO_2$ in the hot exhaust to nitrogen before the exhaust is discharged from the vehicle's exhaust system. So, in many exhaust treatment systems for lean burn engines a suitable flow-through oxidation catalyst body is located suitably close to the engine exhaust manifold to promote the effective and timely oxidation of NO and CO and HC in the exhaust. A second catalyst material is located downstream from the oxidation catalyst reactor in the flowing exhaust gas stream for the reduction of much of the NO and $NO_2$ to nitrogen and water. Sometimes a reductant material is added to the exhaust gas to enable the selective reduction reaction, and other times the engine may be repeatedly, but very briefly, operated in a fuel-rich mode to supply small amounts of unburned fuel as a reductant for the nitrogen oxides.

On cold engine start-up, these oxidation and reduction catalyst materials must often be heated from an ambient temperature to their respective operating temperatures by the exhaust stream. It is necessary to convert most of the carbon monoxide and unburned hydrocarbons in the exhaust to carbon dioxide and water, and to convert most of the NOx to nitrogen during all stages of engine operation, including the period when the exhaust system is being heated following a cold start.

Practices of this invention make use of the inventors' observation that hydrogen, in amounts of about 100 to 1000 ppm or more, is present in the exhaust of the diesel engine following engine cold-start. The engine is typically operated under a computerized engine control system for management of timing and amount of fuel injection and air flow, and, during periods following a cold start, hydrogen may be caused to be present in the exhaust of the diesel engine during this stage of vehicle operation. The silver/alumina material employed in practices of this invention uses the presence of suitable (but relatively small) amounts of hydrogen in combination with the silver catalyst and storage material, closely located to the exhaust manifold of the engine, to promote some oxidation of NO to $NO_2$, at exhaust temperatures in the range of 75° C. to about 250° C., and to temporarily store some of the mixture of NO and $NO_2$ until the exhaust gas heats the silver material above its best operating temperature, and other downstream exhaust treatment reactors take over the exhaust treatment functions. It is preferable that the exhaust stream is brought into contact with the silver-containing oxidation catalyst before it flows into contact with another exhaust treatment materials. However, it is recognized that in some engine systems a portion of the exhaust stream may be diverted as it leaves the exhaust manifold and recirculated into the combustion chambers of the engine.

Thus, as illustrated in the schematic exhaust flow diagram of FIG. 1, the exhaust from a diesel engine, following a cold-start, (Box 10) comprises nitric oxide (NO), oxygen, and hydrogen. Of course, the exhaust gas also contains (as described above) a small amount of $NO_2$, carbon dioxide, carbon monoxide, residual fuel hydrocarbons, oxygen, water, and nitrogen. But the task of the $Ag/Al_2O_3$ reactor (Box 12) is to benefit from the presence of the hydrogen and to use some of the oxygen in oxidation of some of the NO to $NO_2$. Thus, the relatively cool exhaust stream and the relatively cool silver reactor material, starting for example at about 75° C. and gradually warming to about 250° C., interact to convert much of the NO to $NO_2$ and to store some of the reacted NOx on surfaces of the silver/alumina material. As illustrated in FIG. 1, the continual flow of the warming exhaust gas carries it, in succession, in the closed, flow-through exhaust system, from the $Ag/Al_2O_3$ vessel (Box 12) to the DOC reactor (Box 14, typically containing a PGM catalyst, a mixture of Pt and Pd), a selective catalytic reduction reactor (SCR, Box 16), and a filter for diesel particulates (DPF, Box 18). In some embodiments of the invention a reductant for NOx such as ammonia or a hydrocarbon may be added to the exhaust at a location upstream of the SCR reactor 16. Also, in some embodiments of the invention, it may be preferred to combine an $Ag/Al_2O_3$ catalyst and the DOC catalyst as wash coat material in a single, flow-through cordierite body as will be described below in this specification.

Initially, the warming DOC (Box 14) may also store some NOx escaping from the silver catalyst (Box 12). But, gradually, the DOC (Box 14) will commence oxidation of carbon monoxide, unburned hydrocarbons, and further oxidation of NO. As the DOC (Box 14) reaches its optimum operating temperature, it takes over the oxidation function of the silver/alumina reactor (Box 12). Depending on the adopted $NO_2$-enhanced NOx reduction catalyst, a reductant material such as an aqueous solution of urea may be added to the exhaust before it enters the SCR reactor (Box 16). And diesel particulate material is removed from the exhaust stream in the DPF (Box 18) before the exhaust is discharged from the tailpipe of the vehicle.

While the downstream members of a diesel or lean burn engine exhaust may vary in selected function, the $Ag/Al_2O_3$ reactor is used for a temporary period of time, following an engine start-up, to improve NOx management of the exhaust system by oxidizing NO and storing NOx when the exhaust system is relatively cold, and until the downstream members of the exhaust system commence their intended functions.

Figure 2:
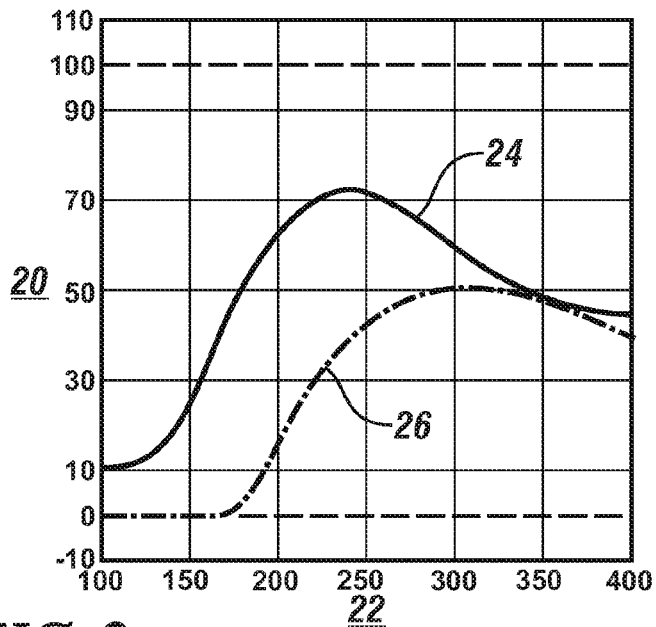
FIG. 2 is a graph of % Conversion of NO to $NO_2$ (vertical axis 20) versus Average Catalyst Temperature (° C.) (horizontal axis 22) for synthetic exhaust streams flowing respectively over a 2% $Ag/Al_2O_3$ catalyst bed (curve 24) and a PGM DOC (7:1 Pt:Pd at 49 $g/ft^3$) catalyst bed (curve 26).

The graph of FIG. 2 illustrates the effectiveness of a 2 weight percent Ag particulate catalyst, supported on alumina particles, in oxidation of nitric oxide (NO) to nitrogen dioxide ($NO_2$) in a synthetic exhaust stream containing hydrogen. The silver catalyst was prepared by depositing silver on alumina particles and aging the material in air with 10% water at 650° C. for 24 hours. Like NO oxidation testing was performed using a commercial DOC catalyst consisting of a mixture of platinum and palladium on particles of alumina (7:1 Pt:Pd at 49 g/cubic foot).

In the testing underlying FIG. 2, the respective catalyst materials were placed in a quartz reactor tube and inserted in a furnace in which they were progressively heated at temperature levels in the range from 100° C. to 400° C. at 2° C. per minute. Synthetic gas mixtures consisting of 195 ppm NO, 10 ppm $NO_2$, 500 ppm hydrogen, 400 ppm carbon monoxide, 238 ppm propene, 96 ppm propane, 5% water, 8% carbon dioxide, 10% oxygen, and the balance nitrogen were flowed through the catalyst particles at a space velocity of SV=30,000 $h^{-1}$. The composition of the gas exiting the catalyst bed was measured using a Fourier transform infrared (FTIR) spectrometer. The conversion values of NO to $NO_2$ (vertical axis, 20) over a temperature range of 100° C. to 400° C. (horizontal axis, 22) for each catalyst are presented graphically in FIG. 2. It is seen that the NO conversion using the silver catalyst (curve 24) starts below 100° C. and reached a maximum of about 72% conversion at about 235° C. The PGM catalyst (curve 26) did not start conversion of NO until the catalyst reached about 170° C. and reached a maximum conversion of about 51% at about 310° C. These tests are representative of many tests that confirm the capability of the subject silver catalyst in oxidation of NO to $NO_2$ in oxygen-containing exhaust mixtures containing hydrogen and hydrocarbons.

It is found experimentally that hydrogen contents of about 100 ppm to about 1000 ppm or more in the NO, water, and oxygen containing exhaust mixtures contribute significantly to the effectiveness of the silver catalyst in oxidizing NO to $NO_2$ and in storing NO and $NO_2$. In general, it is found that the presence of carbon monoxide and hydrocarbons do not inhibit the oxidation of NO over the silver catalyst in the hydrogen-containing stream.

Figure 3:
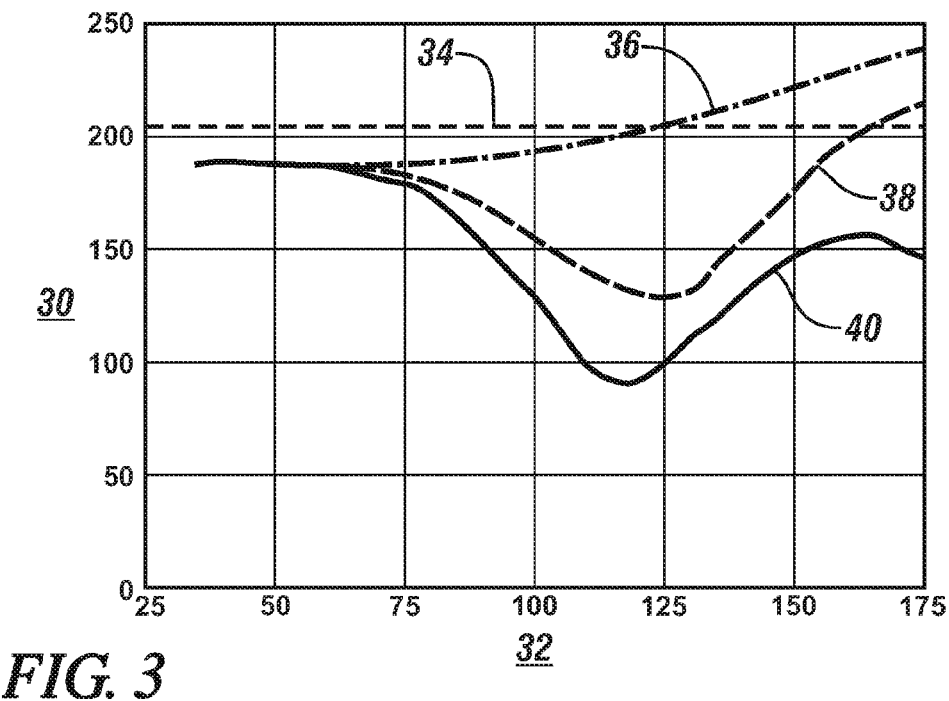
FIG. 3 is a graph of Concentration (ppm) of NOx stored on $Ag/Al_2O_3$ (vertical axis 30) versus Average Catalyst Temperature (° C.) (horizontal axis 32) for synthetic exhaust streams initially containing 205 ppm NOx (horizontal line 34=195 ppm NO and 10 ppm $NO_2$) and 0 ppm $H_2$ (curve 36) or 200 ppm $H_2$ (curve 38) or 500 ppm $H_2$ (curve 40), each flowing over a 2% $Ag/Al_2O_3$ catalyst bed.

The storage of NOx produced by the oxidation of NO to $NO_2$ from an NO-containing stream is demonstrated in the testing underlying FIG. 3, where the 2 weight percent Ag catalyst on alumina was placed in the reactor tube and inserted in a furnace in which it was progressively heated at temperature levels in the range from 35° C. to 175° C. at 36° C. per minute. In an attempt to simulate a cold start on a vehicle, synthetic gas mixtures consisting of 195 ppm NO, 10 ppm $NO_2$, 400 ppm carbon monoxide, 238 ppm propene, 96 ppm propane, 2% water, 8% carbon dioxide, 10% oxygen, and the balance nitrogen were flowed through the catalyst particles at a space velocity of SV=30,000 $h^{-1}$. In FIG. 3 the amount of NOx in ppm stored on the silver/alumina catalyst from each synthetic gas mixture is presented at the vertical axis, 30 at the average catalyst temperature (° C.) along the horizontal axis, 32. The NOx concentration (205 ppm) in the inlet stream is indicated by horizontal line 34. Thus, NOx concentration values below this line indicate the storage of NOx over the silver catalyst. The concentration values of absorbed $NO_x$ with either 0 ppm hydrogen (curve 36) or 200 ppm hydrogen (curve 38) or 500 ppm hydrogen (curve 40) are presented graphically in FIG. 3. It is seen that the NO concentration using the silver catalyst starts decreasing above about 75° C. as the concentration increases from 0 to 200 to 500 ppm $H_2$. These tests are representative of many tests that confirm the capability of the subject silver catalyst in oxidation of NO to $NO_2$ and its subsequent storage in oxygen-containing exhaust mixtures containing hydrogen.

Figure 4:
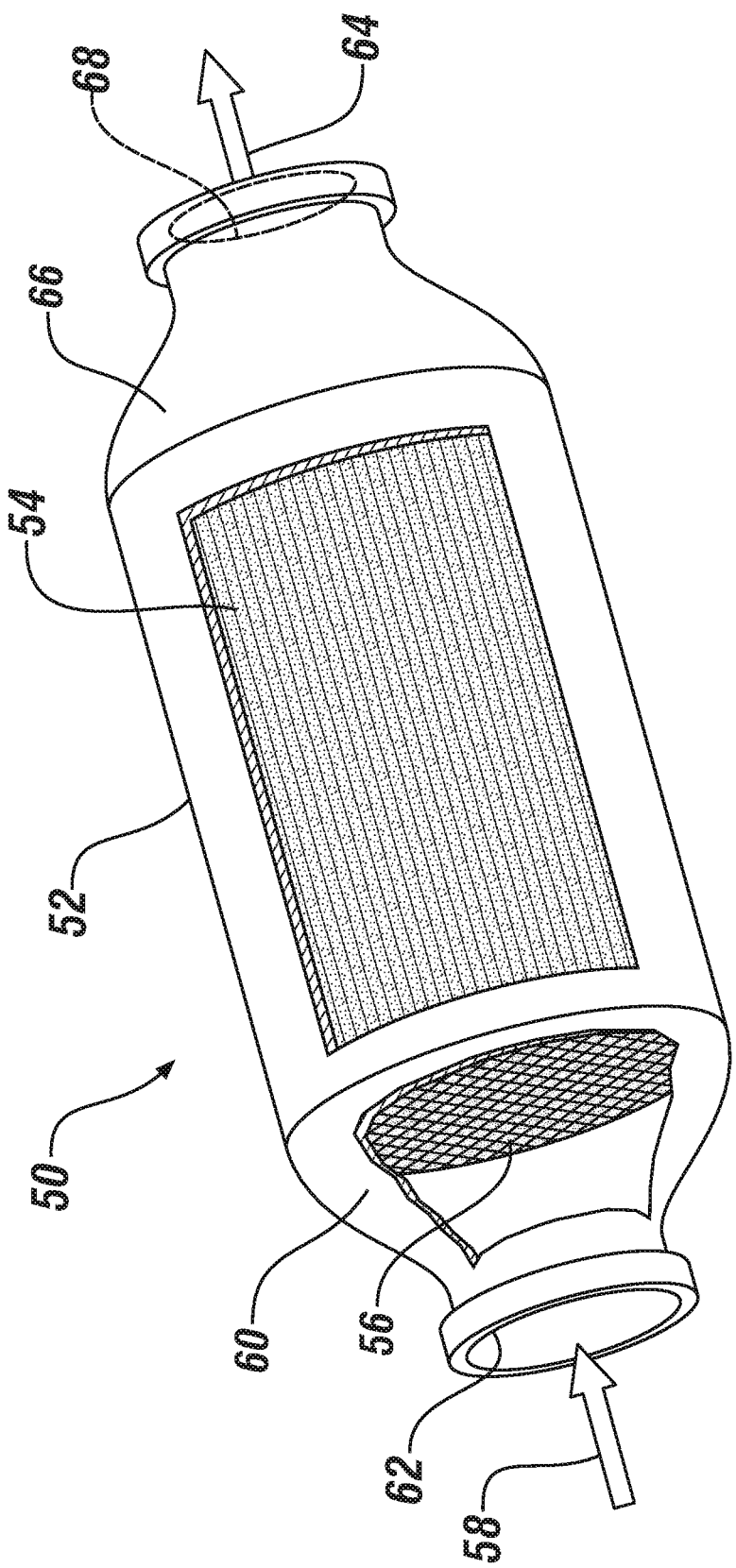
FIG. 4 is an oblique side view of a cylindrical flow-through stainless steel container enclosing an extruded cylindrical cordierite body with many parallel channels, each having square cross-sections and extending from a flat exhaust gas flow inlet face of the body to a flat exhaust gas flow outlet face of the body. The four walls of each channel are coated with a thin wash coat layer of a silver/alumina catalyst for use in accordance with this disclosure. In this illustration the container and cordierite body are each formed as round cylinders, and a portion of the round container wall is broken away to reveal the cordierite body.

An illustration of a suitable catalytic reactor 50 for containing a silver/alumina catalyst in the exhaust stream of a diesel engine is presented in FIG. 4. The reactor 50 may comprise a round tubular stainless steel body 52 for tightly enclosing an extruded, round cylindrical, honey-comb shaped cordierite catalyst support body 54 which is seen in two broken out windows in the side of body 52. Catalyst support body 54 may be formed of other known and suitable high temperature resistant metal or ceramic material. In this embodiment, cordierite catalyst support body 54 is formed with many exhaust gas flow-through channels that extend from an upstream exhaust gas inlet face 56 of the support body 54 through the length of the body to a downstream exhaust gas outlet face (not visible in FIG. 4) of the body 54. For example, 400 flow-through channels per square inch of inlet face are typically formed during extrusion of the ceramic body. The walls of these small flow-through channels are represented as crossing lines in the illustration of the exhaust gas flow inlet face 56. A silver-on-alumina particle catalyst in the form of a washcoat is coated on the walls of each of the channels of the extruded ceramic support body 54. The diameter of steel body 52 and enclosed silver based oxidation catalyst support body 54 is enlarged with respect to the upstream and downstream exhaust conduits so as to reduce drag on the exhaust stream as it engages the inlet face 56 of the silver catalyst support body and flows through the wash coated channels. Support body 54 is sealed within steel body 52 so that exhaust gas flow is directed into contact with the silver/alumina wash coat on the channel wall surfaces of support body 54. The catalyst support body is sized with sufficient channel wall surface area to carry sufficient wash coat material to provide sufficient catalyst contact with a flowing-exhaust gas during its residence time in the reactor 50.

As seen in FIG. 4, the upstream end of steel enclosure body 52 (as indicated by exhaust flow direction arrow 58 is enclosed by an expanding stainless steel exhaust inlet section 60. Exhaust inlet 62 of exhaust inlet section 60 is sized and adapted to receive exhaust flow from an exhaust conduit (not shown in FIG. 4) close-coupled to the exhaust manifold of a diesel engine or other lean burn engine. In a like manner, the downstream end (exhaust flow arrow 64) of the steel enclosure body 52 is enclosed by a converging exhaust outlet section 66 with an exhaust gas outlet 68. Outlet 68 is adapted to be welded or otherwise connected to an exhaust conduit to conduct the exhaust gas to a further downstream treatment reactor such as a DOC reactor or an SCR reactor.

In the above illustration the silver/alumina catalyst was wash coated along the full length of an extruded cordierite body sized for the oxidation of NO and storage of NOx during the cold start period of an engine. However, such a catalyst support body may be sized for both silver-catalyzed oxidation and the DOC function. That is, in other embodiments the silver material could be employed as a wash coat in channels at the up-stream end of an extruded monolithic support body with a conventional DOC catalyst wash coated onto the downstream ends of the same channels. In other embodiments, the silver catalyst material may be applied as a wash coat layer over a previously applied wash coat of PGM or other DOC material.

Thus, a silver/alumina catalyst is very helpful in the oxidation of NO to $NO_2$ in relatively low temperature diesel exhaust streams where the exhaust contains relatively small amounts of hydrogen, for example 100 ppm to 1000 ppm or more of hydrogen in an exhaust stream. The silver content of the silver/alumina catalyst is suitably in the range of about 0.5% to about 10%. Engine operation can readily be managed during such cold-start periods to provide hydrogen from the combustion of diesel fuel for such temporary oxidation and storage functions of the silver catalyst material.

The invention claimed is:

1. A method of treating the exhaust gas stream flowing from a vehicle internal combustion engine during a period following a cold-start of the engine, the exhaust gas stream comprising a mixture of nitric oxide, carbon monoxide, hydrocarbons, hydrogen, water, carbon dioxide, oxygen, and nitrogen, the exhaust gas stream being at an initial temperature below 100° C. and progressively warming during further engine operation, the method comprising;

continually passing the hydrogen, oxygen, and nitric oxide-containing exhaust gas stream in contact with a silver/alumina particulate catalyst to oxidize at least a portion of the nitric oxide to nitrogen dioxide and to temporarily store some of the nitrogen oxide and nitrogen dioxide product on the particulate catalyst material, the silver/alumina particulate catalyst consisting of particles of silver or silver oxide deposited on carrier particles of alumina, the silver/alumina particulate catalyst oxidizing nitric oxide to nitrogen dioxide in the presence of hydrogen and temporarily storing nitrogen oxide and nitrogen dioxide product as the exhaust gas temperature range is progressively warmed from 100° C. to 190° C.; then, continually passing the exhaust gas stream into contact with at least one downstream catalytic material for further oxidation of nitric oxide or for reduction of nitric oxide and nitrogen dioxide as the exhaust gas increases in temperature and heats each such downstream reactor to an operating temperature; and continuing the passage of the exhaust gas through each reactor during the duration of engine operation, while stored material is removed from the silver/alumina particulate catalyst and the silver/alumina particulate catalyst ceases its affect on the warmed exhaust gas stream until the engine is stopped and started again, following an engine cool-down period.

2. A method of treating the exhaust from a vehicle internal combustion engine as recited in claim 1 in which the silver/alumina catalyst consists of particles of silver or a silver oxide deposited on carrier particles of alumina and the silver content is in the range of 0.5% to 10% of the total of the particles of silver or silver oxide and alumina.

3. A method of treating the exhaust from a vehicle internal combustion engine as recited in claim 1 in which the hydrogen and nitric oxide-containing exhaust is passed in contact with the silver/alumina particulate catalyst and then with a different oxidation catalyst for NO, which oxidation catalyst is composed to commence oxidation of NO at temperatures of about 190° C. or higher.

4. A method of treating the exhaust from a vehicle internal combustion engine as recited in claim 3 in which the different oxidation catalyst for NO comprises a platinum group metal.

5. A method of treating the exhaust from a vehicle internal combustion engine as recited in claim 1 in which the silver/alumina particulate catalyst is located so that exhaust gas exits an exhaust manifold of the engine in a defined exhaust gas flow path and flows into contact with the silver/alumina catalyst after flowing no more than about fifty centimeters distance along the flow path after leaving the exhaust manifold.

6. A method of treating the exhaust from a vehicle internal combustion engine as recited in claim 1 in which the vehicle internal combustion engine is a diesel engine which is controlled to operate at an air-to-fuel ratio of about 17:1 during a major portion of its operation.

7. A method of treating the exhaust from a vehicle internal combustion engine as recited in claim 1 in which the silver/alumina particulate catalyst is deposited as wash coat layers on the wall surfaces of parallel open-ended channels in an monolithic body, the parallel open-ended channels extending from an exhaust gas flow inlet to an exhaust gas flow outlet of the monolithic body.

8. A method of treating the exhaust from a vehicle internal combustion engine as recited in claim 7 in which the silver/alumina particulate catalyst is deposited as wash coat layers on the wall surfaces of parallel open-ended channels in an monolithic body at the gas flow inlet end of the body and particles of an oxidation catalyst comprising particles of a platinum group metal are deposited as a wash coat on the wall surfaces of parallel open-ended channels at the gas flow outlet end of the body.

9. A method of treating the exhaust from a vehicle internal combustion engine as recited in claim 7 in which particles of an oxidation catalyst comprising particles of a platinum group metal are deposited as a wash coat on the wall surfaces of parallel open-ended channels, the wash coat of platinum group metal extending on the wall surfaces from the exhaust gas flow inlet of the body to its exhaust gas flow outlet, and in which particles of the silver/alumina particulate catalyst are deposited as a wash coat overlying the wash coat particles of the platinum group metal.

10. A method of treating the exhaust from a vehicle internal combustion engine as recited in claim 1 in which the hydrogen content of the total exhaust gas stream is in the range of about 100 ppm to about 1000 ppm during a period following the cold start of the engine.

11. A method of treating the exhaust gas stream flowing from a vehicle internal combustion engine during a period following a cold-start of the engine, the engine being operated in a lean-burn mode during the cold start, the exhaust gas stream comprising a mixture of nitric oxide, carbon monoxide, hydrocarbons, hydrogen, water, carbon dioxide, oxygen, and nitrogen, the exhaust gas stream being at an initial temperature below 100° C. and progressively warming during further engine operation, the method comprising;

continually passing the hydrogen, oxygen, and nitric oxide-containing exhaust gas stream in contact with a silver/alumina particulate catalyst to oxidize at least a portion of the nitric oxide to nitrogen dioxide and to temporarily store some of the nitrogen oxide and nitrogen dioxide product on the particulate catalyst material, the silver/alumina particulate catalyst being the first catalyst material contacted by the flowing exhaust gas stream, the silver/alumina catalyst consisting of particles of silver or a silver oxide deposited on carrier particles of alumina, the silver content being in the range of 0.5% to 10% of the total of the particles of silver or silver oxide and alumina, the silver/alumina particulate catalyst oxidizing nitric oxide to nitrogen dioxide in the presence of hydrogen and temporarily storing nitrogen oxide and nitrogen dioxide product as the exhaust gas is progressively warmed from 100° C. to 190 ° C.; then, immediately and continually passing the exhaust gas stream into contact with a catalytic material comprising particles of one or more platinum group metals for oxidation of nitric oxide as the exhaust gas increases in temperature and heats the platinum group metal catalyst to an operating temperature; and continuing the passage of the exhaust gas into contact with each of the silver/alumina catalyst and the particles of platinum group metal for the duration of engine operation, while stored material is removed from the silver/alumina particulate catalyst and the silver/alumina particulate catalyst ceases its affect on the warmed exhaust gas stream when it has reached at temperature of about 190° C. or lower and until the engine is stopped and started again, following an engine cool-down period.

12. A method of treating the exhaust from a vehicle internal combustion engine as recited in claim 11 in which the silver/alumina particulate catalyst is located so that exhaust gas exits an exhaust manifold of the engine in a defined exhaust gas flow path and flows into contact with the silver/alumina catalyst after flowing no more than about fifty centimeters distance along the flow path after leaving the exhaust manifold.

13. A method of treating the exhaust from a vehicle internal combustion engine as recited in claim 11 in which the hydrogen content of the total exhaust gas stream is in the range of about 100 ppm to about 1000 ppm during a period following the cold start of the engine.

14. A method of treating the exhaust from a vehicle internal combustion engine as recited in claim 11 in which the vehicle internal combustion engine is a diesel engine which is controlled to operate at an air-to-fuel ratio of about 17:1 during a major portion of its operation.

15. A method of treating the exhaust from a vehicle internal combustion engine as recited in claim 11 in which the silver/alumina particulate catalyst is deposited as wash coat layers on the wall surfaces of parallel open-ended channels in an monolithic body, the parallel open-ended channels extending from an exhaust gas flow inlet to an exhaust gas flow outlet of the monolithic body.

16. A method of treating the exhaust gas stream as recited in claim 11 in which the exhaust gas stream passing from the particles of platinum group metal catalyst particles is then subjected to a catalyzed reduction reaction to reduce nitrogen oxides to nitrogen.

17. A method of treating the exhaust from a vehicle internal combustion engine as recited in claim 15 in which the silver/alumina particulate catalyst is deposited as wash coat layers on the wall surfaces of parallel open-ended channels in an monolithic body at the gas flow inlet end of the body and particles of an oxidation catalyst comprising particles of a platinum group metal are deposited as a wash coat on the wall surfaces of parallel open-ended channels at the gas flow outlet end of the body.

18. A method of treating the exhaust from a vehicle internal combustion engine as recited in claim 15 in which particles of an oxidation catalyst comprising particles of a platinum group metal are deposited as a wash coat on the wall surfaces of parallel open-ended channels, the wash coat of platinum group metal extending on the wall surfaces from the exhaust gas flow inlet of the body to its exhaust gas flow outlet, and in which particles of the silver/alumina particulate catalyst are deposited as a wash coat overlying the wash coat particles of the platinum group metal.

* * * * *